United States Patent [19]
Bailey, Jr.

[11] 3,707,753
[45] Jan. 2, 1973

[54] METHOD OF MAKING CAGES

[75] Inventor: Joseph K. Bailey, Jr., Lakewood, N.Y.

[73] Assignee: TRW Inc., Cleveland, Ohio

[22] Filed: Sept. 8, 1971

[21] Appl. No.: 178,717

Related U.S. Application Data

[63] Continuation-in-part of Ser. No. 83,768, Oct. 26, 1970, abandoned.

[52] U.S. Cl..............................29/148.4 C, 29/558
[51] Int. Cl.........................B21d 53/12, B23p 13/04
[58] Field of Search....29/148.4 C, 148.4 R, DIG. 26, 29/558

[56] References Cited

UNITED STATES PATENTS 2,765,518   10/1956   Lovell et al......................29/148.4 C

*Primary Examiner*—Thomas H. Eager
*Attorney*—Hill, Sherman, Meroni, Gross & Simpson

[57] ABSTRACT

An anti-friction rolling element cage having a plurality of circumferentially spaced ball receiving radially directed openings having integral tabs projecting radially inwardly at one end of the openings to prevent ball dropout in a radial direction, the tabs being formed solely by removal of metal from the cage ring blank.

10 Claims, 19 Drawing Figures

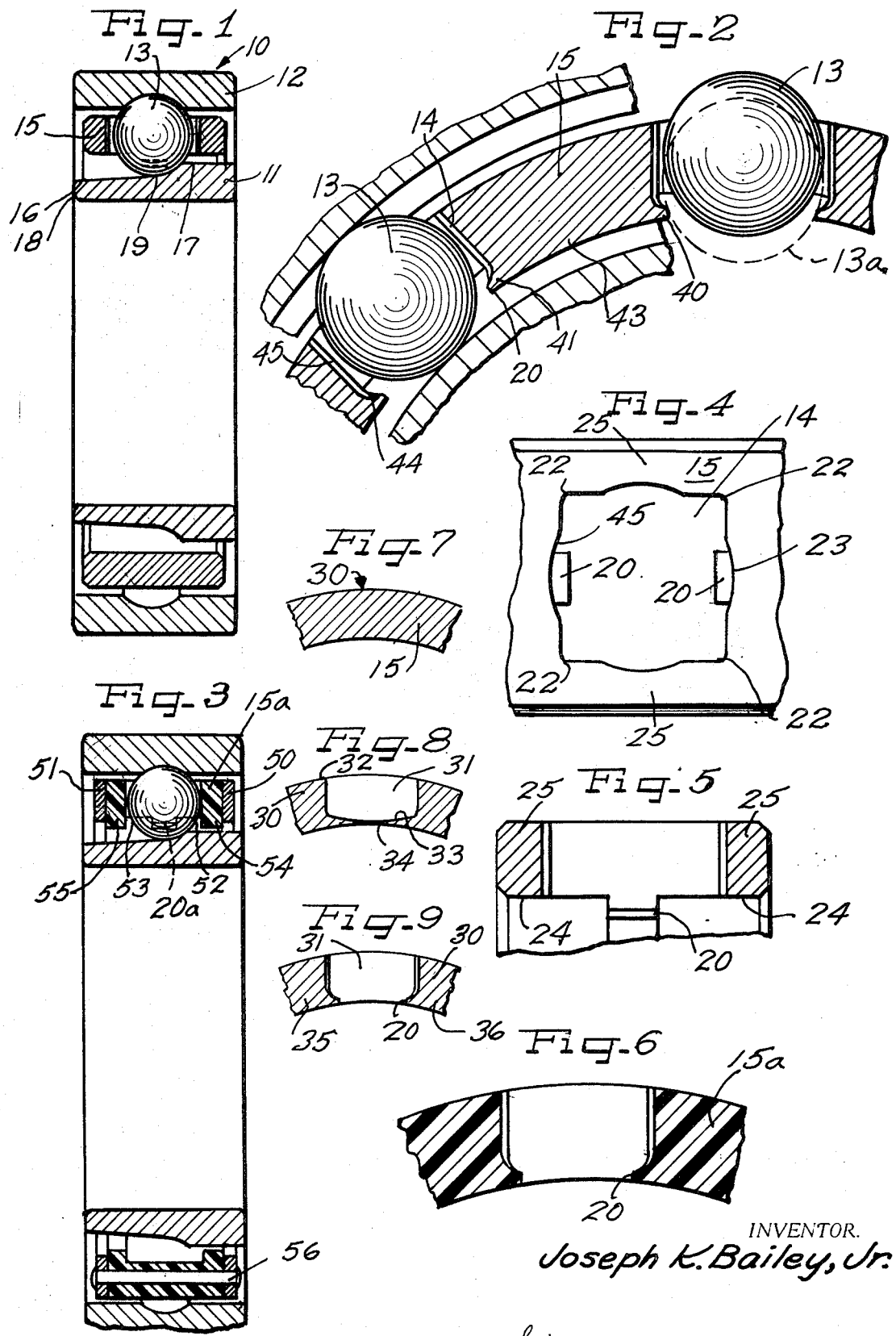

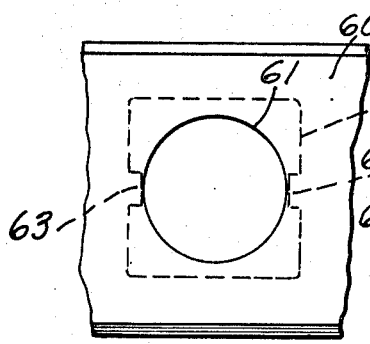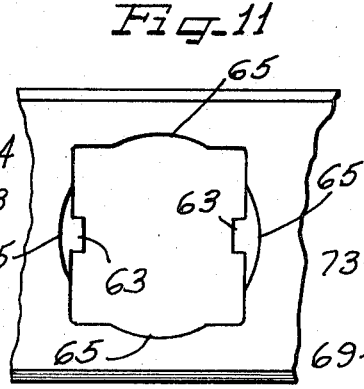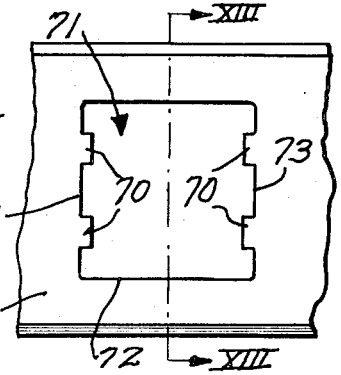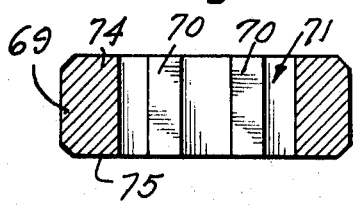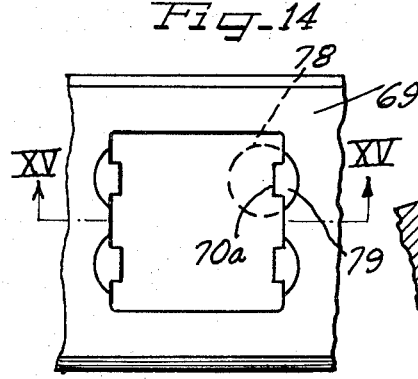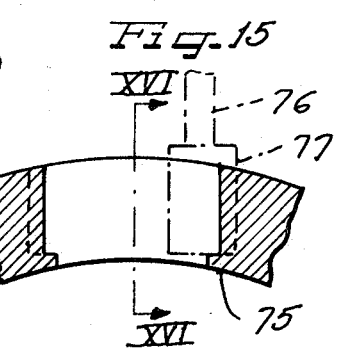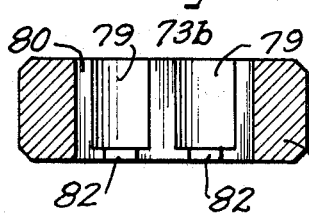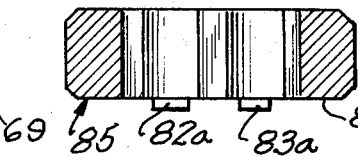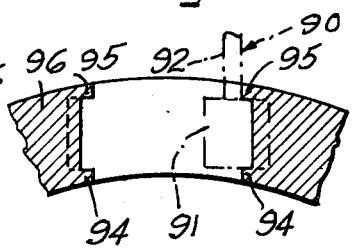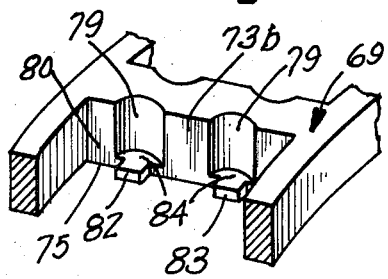

METHOD OF MAKING CAGES

CROSS REFERENCE TO RELATED APPLICATIONS

This application is a continuation in part of my copending application Ser. No. 83,768 titled "BEARING CAGE AND METHOD OF MANUFACTURE," filed Oct. 26, 1970, now abandoned.

BACKGROUND OF THE INVENTION

1. Field of the Invention

This invention relates to bearings and more particularly to bearing cage retainers or separators.

2. Prior Art

In anti-friction bearings such as ball and roller bearings, it is oftentimes desirable to provide a cage or separator to maintain the rolling elements in their approximately proper angular positions against the influence of geometric and load variations which cause the rolling elements to want to deviate from their theoretical or initial spacing.

Further, in disassembleable-type bearings where either the inner or outer ring may be separated from the retainer-ball group, it is desirable to provide a retainer or cage which will maintain the balls or rollers in position to prevent their dropping from the assembly.

Oftentimes, it is necessary only to retain the balls or rollers from escape inward or outward, the remaining function being accomplished by keeping in place the opposing ring, inner or outer. Further, it is oftentimes desirable in such situations to restrain the radial movement of the balls within the retainer to a certain maximum.

Heretofore, this has been achieved by extending certain portions or tangs of the cage or retainer. Such tangs or portions are generally provided by bending parts of the retainer metal. Because of the plastic deformation required, this method of retention is oftentimes disadvantageous.

Further, as a manufacturing consideration, it is desirable to provide integral tangs having the same characteristics as the metal of the retainer, which tangs can be formed by a minimum of machining operations without bending the metal.

Recently it has been known to provide such tangs by a process of selective metal removal from a pre-formed ring. See for example the Lovell et al. U.S. Pat. Nos. 2,657,106 and 2,765,518.

In such retainers, the final retainer is formed from a rectangular cross-section ring which is created with an inner diameter centrally located radially projecting ledge. The ring is then drilled at a plurality of circumferentially spaced points around its circumference from the outer diameter by a tapered ended drill. The drill is not projected entirely through the ring; however, the tapered portion extends through the ring providing a conical diameter reducing area at the bottom of the pocket. Thereafter a notched broach is moved through the drilled area, the notches producing tangs at the inner diameter centrally located radially projecting ledge.

Such prior art devices require a complex ring blank in that the inner diameter projecting ledge is required to be formed on the ring prior to other operations. Additionally, heretofore, the notched broach used provided planar sides to the pocket, the only exception to the planar sides being in the limited area of the tangs at the circumferential fore and aft sides of the pocket.

Additionally in the prior art, because of the limited cross sectional area of the inner diameter radial projection, it is possible, due to shearing during manufacture, for the tang to be broken or chipped either during the drilling operation or the broaching operation.

SUMMARY OF THE INVENTION

The present invention overcomes the disadvantages of the prior art and provides for integral ball-retaining tangs formed solely by metal removal from a retainer ring blank.

The present invention overcomes disadvantages inherent in the prior art by forming, in the preferred single tang embodiment, the finished cage from a generally rectangular cross-section ring blank. This eliminates the need for the centrally located radially projecting inner diameter ledge. The tangs are formed solely by metal removal from the rectangular blank and, in the preferred embodiment, have relieved areas in the pocket walls on the axial ends as well as the circumferential fore and aft ends. The relieved walls reduce friction of a ball or roller riding in the pocket.

In the preferred embodiment, the retainer is made from a generally rectangular cross-section ring blank which is first lined bored by a tapered ended drill. Thereafter a notched broach is moved through the bored areas to form a squared pocket wherein the sides of the square are less than the diameter of the circle formed by the drill thereby leaving relieved areas at the four sides of the pocket. The notches provide for centrally located tangs projecting into the pocket at the bottom thereof.

Thereafter, in one embodiment, portions of the inner diameter may be removed to either side of the tangs to allow the provision of depending tangs which extend radially beyond the inner diameter of the remainder of the blank.

In another embodiment, a three step process is utilized wherein the pockets are originally subjected to a boring operation, circular in nature, to provide a pilot hole. Thereafter, a notched broach is moved through to provide a pocket with circumferentially fore and aft radially extending circumferential projections extending towards the center of the pocket a distance amounting to the difference in size between the notched broach and the smaller diameter pilot hole drill. Thereafter, a larger diameter drill or reamer is used to finish form the pocket providing a relieved area at the four sides of the notched pocket, the reamer or drill removing the majority of the length of the material left by the notches except for the inner diameter portion which thereafter functions as tangs.

In yet another embodiment, a four tang pocket is provided solely by metal removal. In this embodiment, a four notch broach is used and thereafter the metal left by the broach is removed by a small diameter milling device. The pocket can be left substantially rectangular except in the area of metal removal by the milling device, if desired, or further metal can be removed at the axial ends to provide the relieved areas.

In yet another embodiment, both inner and outer diameter tangs are provided either in four or eight tang embodiments, the material of the ledges being removed by a small headed miller.

It is therefore an object of this invention to provide an improved anti-friction rolling element cage having integrally formed ball retained tangs projecting into the pocket areas.

It is yet another objective of this invention to provide a method of manufacturing an improved anti-friction element retaining cage.

It is a further object of this invention to provide a two tang per pocket anti-friction element retaining cage wherein the tangs and pockets are formed solely by metal removal from a rectangular cross-section blank.

It is another object of this invention to provide a four tang per pocket anti-friction element cage wherein the tangs are provided solely by metal removal from a rectangular cross-section ring blank. It is a further object of this invention to provide an anti-friction element retaining cage having circumferentially spaced pockets therein with retainer tangs projecting into the pockets from both the inner and outer diameters, the tangs formed solely by metal removal from a rectangular cross-section blank.

It is yet another object of this invention to provide an anti-friction roller element retainer cage having circumferentially spaced apart pockets with eight tangs projecting into each pocket, four from the inner diameter and four from the outer diameter, the pockets and tangs formed solely by metal removal from a rectangular cross-section ring blank.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a diameter cross-sectional view of an anti-friction bearing according to this invention.

FIG. 2 is an axial fragmentary cross-sectional view of an enlarged scale of the bearing of FIG. 1.

FIG. 3 is a diameter cross-sectional view of a modified form of this invention.

FIG. 4 is a fragmentary plan view of one of the roller element receiving pockets.

FIG. 5 is a fragmentary cross-sectional view of the pocket of FIG. 4.

FIG. 6 is a fragmentary axial cross-sectional view of the retainer of FIG. 3.

FIG. 7 is a fragmentary cross-sectional view of a ring used in the method of manufacture of the retainer of this invention.

FIG. 8 is a view similar to FIG. 7 illustrating the first step in the formation of one of the roller element receiving pockets.

FIG. 9 is a view similar to FIG. 8 illustrating the ring of FIG. 8 with another step in the manufacture of the retainer performed thereon.

FIG. 10 is a fragmentary plan view of a modified form of this embodiment illustrating two manufacturing steps thereon.

FIG. 11 is a view similar to FIG. 10 illustrating a further manufacturing step performed thereon.

FIG. 12 is a view similar to FIG. 10 illustrating another embodiment of this invention after the notching step has been performed thereon.

FIG. 13 is a cross-sectional view taken along the lines XIII—XIII of FIG. 12.

FIG. 14 is a fragmentary plan view of the embodiment of FIGS. 12 and 13 illustrating another manufacturing step performed thereon.

FIG. 15 is a cross-sectional view of FIG. 14 taken along the lines XV—XV and illustrating the performance of a manufacturing step thereon.

FIG. 16 is a cross-sectional view of the embodiment of FIG. 15.

FIG. 17 is a fragmentary perspective view of the embodiment of FIG. 16.

FIG. 18 is a view similar to FIG. 16 illustrating the retainer after a final manufacturing step has been performed thereon.

FIG. 19 is a view similar to FIG. 16 illustrating yet another embodiment with a manufacturing step being performed thereon.

DESCRIPTION OF THE PREFERRED EMBODIMENTS

FIG. 1 illustrates a bearing assembly 10 according to this invention. The assembly consists of an inner race ring 11 and an outer race ring 12 concentric with the inner race ring. Entrapped between the rings in grooves provided therein are a plurality of circumferentially spaced roller elements 13. The elements 13 are spaced apart circumferentially and are received in pockets 14 in a retainer or cage element 15.

The bearing assembly 10 illustrated has a disassembleable inner race ring 11 with a chamfer 16 on the outer diameter 17 at the outboard face 18. The chamfer 16 extends into the race groove 19 and allows the bearing assembly 10 to be disassembled by axial movement of the inner race 11. In such disassembleable bearings, if the inner race or outer race — whichever is disassembleable — is removed, the balls or other roller elements 13 will drop out of the assembly and scatter. In order to retain them in the assembly, the retainer 15 is preferably formed with some means of restraining radial movement of the roller elements 13.

The present invention restrains radial movement of the balls 13 by means of circumferentially extending tabs or tangs 20 positioned at one end of the element-receiving pockets 14. The tangs extend a sufficient distance towards one another to entrap the roller element 13 therebetween as illustrated by the dotted line 13a of FIG. 2. Because the tabs are integral with the retainer 15, they are not subject to weakness as is caused by bending the prior art tabs during their formation.

As best illustrated in FIG. 4, each of the pockets 14 consists of a radial opening through the retainer ring 15 having basically the configuration of a circle with a superimposed square, the side of the square being less than the diameter of the circle but sufficiently large to extend beyond the circle at four corner points 22. The circle has a diameter larger than the diameter of the rolling element 13 so as to allow it to be freely received therein in a manner which would eliminate binding of the roller element therein due to slight deformation of the retainer.

It is an important aspect of this invention that the circle formed by the drilling operation hereinafter described is of larger diameter than the sides of the square of the broaching operation described hereinafter. In this manner, relieved areas are provided in the four sides by the larger diameter of the circle. These relieved areas are in the circumferential fore and aft sides and in the axial side walls of the pocket. By providing the relieved areas, friction is noticeably reduced over a planar side wall pocket.

In one test, utilizing a circular pocket with a relieved area of 90° in one portion of the pocket, the following results were obtained measuring torque in inch ounces. Utilizing the conventional circular pocket, at rotation speeds of 10,000 rpm, 20,000 rpm and 40,000 rpm, the torque was found to be 13.5 in. oz.

Using the relieved area, at 10,000 rpm, 20,000 rpm and 40,000 rpm, the torque was found to be 12, 10 and 9 in. oz. respectively. The weight of the frame assembly on the retainer of ball force was constant at 4.3 lbs. Therefore, it has been found advantageous to provide the relieved areas in the side walls of the pocket and thereby reduce friction.

The tangs 20 project from the inner diameter area of the pocket 14 towards one another from circumferentially spaced curved portions 23. In the illustrated embodiment, the tangs extend radially inwardly below the inner diameter 24 of the main portion of the retainer 15. Preferably, the pockets 14 are dimensioned larger than the balls or other roller elements 13 while the tangs terminate in spaced-apart relation slightly less than the diameter of the rollers. In this manner, the rollers are prevented from dropping radially inwardly in the embodiments illustrated or radially outwardly where the retainer 15 is made with the tangs at the outer diameter of the pockets.

FIGS. 5, 7, 8 and 9 illustrate the steps taken in forming the ring illustrated in FIGS. 1 and 2. The retainer 15 is formed from an annular ring 30 which has a radial thickness at least equal to the desired dimension from the outer diameter of the retainer 15 as illustrated in FIG. 2 to the inner diameter of the tang 20.

It is of primary importance of this invention that the initial ring is substantially rectangular in cross section with the only modifications being radius bend or chambered angles formed at the corner. Thus, the ring blank is economically formable and does not require any unusual configurations which may, as is common in the prior art, necessitate extra careful machining steps to prevent shearing of desired lands.

Thereafter, as illustrated in FIG. 8, a plurality of circumferentially spaced-apart circular holes 31 are bored in the ring 30 from the outer diameter 32 thereof to a depth less than the thickness of the ring so that the full diameter opening 31 terminates at a point 33 spaced from the inner diameter 34 of the ring 30.

Thereafter, as best illustrated in FIG. 9, a notched broach is extended through the opening 31, as formed by the drill, the entire distance of the radial thickness of the ring 30. By forming the notches on the broach diametrically opposed, the lands from which the tangs 20 are formed are left projecting into the opening 31 in circumferentially opposed position. Thereafter, as illustrated in FIG. 5, the inner diameter side walls 35 and 36 in FIG. 9 are removed as by a grinding step or milling step. Thus, the tangs 20 are formed by opposite ends 40 and 41 of a centrally disposed tongue 43 integral with the remainder of the retainer 15 and extending circumferentially around the inner diameter of the retainer except where breached by the pockets 14. It can thus be seen that the tangs 20 are formed solely by metal removal from the retainer ring 30 by a process which does not require complicated machining operations. The axial curvature 44 extending from the side wall 45 of the opening 31 of the pockets 14 which forms the tang, can be provided for either by drilling the opening 31 in the step illustrated in FIG. 8 with a drill bit having a desired end curvature or by a further machining step.

FIGS. 3 and 6 illustrate a modified form of this invention wherein the retainer 15a is equipped with side plates 50 and 51. The retainer 15a is formed substantially as described above in connection with the retainer 15, except that in the grinding or milling step, the entire side walls 35, 36 are not removed, instead grooves 52 and 53 are provided to either axial side of the tangs 20a thereby leaving full radial width side wall portions 54 and 55 at the inboard and outboard ends of the retainer 15a. The side plates 50 and 51 may be attached as by rivets 56.

FIGS. 10 and 11 illustrate a modified form of the method of manufacturing the retainer cage of the invention. In the method, illustrated in FIGS. 7 through 9 and 5, the rectangular cross-section ring was first bored with a drill having a reduced diameter lead and a full diameter shaft portion as is illustrated in FIG. 8. The drilling operation as illustrated did not necessarily pierce entirely through the ring and the full diameter portion never pierced through the ring. Thereafter, the drill pockets were broached with a square broach having notches therein thus substantially completing the pockets. Thereafter, the metal was removed from the inner diameter or outer diameter to provide the circumferential centrally disposed interrupted ledge or tongue 43. In each instance, the diameter of the drill was greater than the side walls of the notch broach so as to provide relieved areas on the four sides of the resulting pockets.

In FIGS. 10 and 11, the method is substantially the same and originates with the preparation of a substantially rectangular cross-section ring 60. Thereafter pilot holes 61 are drilled radially through the ring at circumferentially spaced points. The pilot holes are drilled with a drill which has a diameter equal to or less than the space 62 between the tangs 63 to be formed. This is illustrated by the lines 62 marked in FIG. 10 wherein the tangs 63 are dotted in to illustrate where they will be formed by the notched broach. The pilot holes then provide for metal removal for the majority of the area of the pocket.

Thereafter, a notched broach having a rectangular shape with central grooves spaced in opposed relation on opposite walls to form the tang portions is moved through the material of the ring in the area of the pilot holes as is illustrated by the broken line 64, FIG. 10.

Thereafter, a second or finishing drill having a larger diameter than the side walls of the broach is projected into the broached openings. The finishing drill creates the relieved area 65 on the four side walls of the notch opening. The finishing drill is not projected entirely through the ring but is terminated at a projected distance sufficient to leave the tangs 63 at the inner or outer diameter, whichever is desired.

Thereafter, metal may be removed as in the step described in connection with FIG. 5 from either the inner or outer diameter axially adjacent to the tang 63 so that the tangs form a tongue equivalent to the tongue 43 of FIG. 2 projecting below the main body of the ring.

In connection with the description of FIG. 11, it is to be noted that the finishing drill as described does not have to be a drill with a tapered end but can be a square ended reamer if so desired whereby the tangs 63 have flat tops projecting from the relieved areas 65 at a right angle thereto rather than the tapered projection described at 44 in FIG. 2.

FIGS. 12 through 18 illustrate another embodiment of this invention wherein four tangs are provided per pocket, each of the tangs being provided either adjacent to the inner diameter or adjacent to the outer diameter.

The embodiment of FIGS. 12 through 18 begins with formation of a substantially rectangular cross-section ring. Thereafter, a pilot hole may be provided for each pocket if desired. A broach, which is cut to provide four ledges or projections 70 is then used to create a plurality of circumferentially spaced pockets 71 having radial end walls 72 substantially planar and circumferential end walls 73 each of which has two ledges 70 projecting into the interior of the pocket 71 a short distance.

As best illustrated in FIG. 13, the ledges 70 are continuous from the outer diameters 74 to the inner diameter 75 of the ring 69. The ledges 70 of each pocket terminate in spaced relation from opposed ledges a distance which is less than the diameter of the anti-friction rolling element to be received in the pocket. The walls 73 intermediate the ledges is spaced apart greater than the diameter of the anti-friction element whereby the element can be received in the pocket except for the ledges.

The next step is illustrated in FIGS. 14 and 15 wherein a smaller diameter reamer, milling cutter, or side drill 76 is used to remove material from the ledges 70 and the ring blank 69 in the area of the ledges. The milling cutter 76 has a small diameter head 77 as compared to the milling cutter or reamer used in prior embodiments. In the prior embodiments the reamer or milling cutter was moved into the pocket once to provide the relieved areas such as the areas 65 in FIG. 11 on all four sides of the pocket. In the present embodiment, the milling cutter 76 is used four times in each pocket, once for each ledge 70. The broken line 78 of FIG. 14 illustrates the placement of the milling cutter for one operation wherein the portion of the material of the ledge 70a is removed radially inwardly from the outer diameter, with the movement of the milling cutter terminated radially at a point spaced from the inner diameter 75 whereby a portion of the ledge 70a remains at the inner diameter 75 to provide a projecting tang. Due to the use of a circular head 77, a relieved area 79 is provided in the material of the ring 69 immediately behind the ledge 70a.

FIGS. 16 and 17 illustrate the side wall 73b of a pocket 80 after a milling cutter 76 has performed the above described operation. Each of the tangs 82 and 83 is formed by the inner diameter-most 75 portion of the ledge 70 which has not been removed by the milling cutter 76. Outwardly from the tangs 83 are axially spaced-apart relieved areas 79 having arcuate back walls providing relieved areas open to the pocket in the material of the ring blank 69. The relieved areas 79 terminate in flat bottom 84 common to the top wall of the tangs 82 and 83.

An additional step may be taken if desired, as illustrated in FIG. 18. In that Figure a portion of the inner diameter of the ring 85 has been removed by machining as previously discussed in connection with FIG. 5. The metal removal increases the inner diameter of the ring and provides for the projection of the tangs 82a and 83a radially below the major portion of the inner diameter 86 of the ring. The tangs 82a and 83a then form circumferentially projecting portions of a pair of interrupted circumferential ledges corresponding to the ledges 43 of FIG. 2. In this manner the tangs themselves have material strength and stability due to the continuous nature of the ledge between adjacent pockets, however the weight of the retainer as a whole is reduced.

FIG. 19 illustrates yet another modification of the retainer cage of this invention. As described earlier, the function of the tangs is to retain the anti-friction elements of the pocket when the retainer is removed from contact with one of the race rings. Oftentimes, it is desirable, however, to provide a retainer which will retain the elements when the retainer and elements have been removed entirely from the race rings, both inner and outer. Therefore, the embodiment of FIG. 19 provides tangs at both the inner and outer diameters of the retainer. The tangs then entrap the anti-friction elements in the pockets between the inner and outer opposed tangs. The modification of FIG. 19 can be used either with the two tang embodiment illustrated in the FIG. 10 and 11 or the four tang illustrated in FIGS. 12 through 18. That is to say four tangs may be provided per pocket two on the inner diameter and two on the outer diameter or eight tangs may be provided per pocket four on the inner diameter and four on the outer diameter.

The method of producing the tangs is similar to the method described in connection with FIGS. 10 through 18 in that a notched broach is used to create a pocket having ribs or ledges extending from the inner diameter to the outer diameter substantially as shown at 70 in FIG. 13. Thus, where a pilot hole is used, such as illustrated in FIG. 10, the pilot hole must have a diameter less than the spacing between opposed ribs or ledges.

After formation of the pocket with the ledges, a milling tool such as illustrated at 90 in FIG. 19 which has a head 91 of given axial length and which terminates in a smaller diameter shaft 92 in one axial end of the head, which shaft is used for attachment to the tool operating the milling cutter 90, is used to form the tangs from the ledges. In the preferred method illustrated in FIG. 19, the cutting portion or milling portion of the head 91 has an axial length equal to the desired radial distance between inner 94 and outer 95 tangs. The head portion 91 is preferably cylindrical. The tangs are therefore produced as illustrated in FIG. 19 by moving the cutter against the ledge and continuing movement thereof to remove the intermediate portions of the ledge, forming inner and outer tangs spaced apart by the removed portion of the ledge. Further, the milling cutter is continued into the material of the ring 96 a distance sufficient to form a relieved area circumferentially behind intermediate tangs. If desired the milling cutter may have a curvature at the intersection of its axially extending diameter wall and the radially extending axial end wall thereby providing curved tangs as illustrated at 44 in FIG. 2. Alternatively, the milling may be right angled to provide the type of tangs illustrated in FIG. 17. It will be further appreciated that a milling cutter having an axially shorter head may be used if desired wherein the milling cutter will be moved axially during the formation of the tangs to remove the metal from the ledges at selected points along a line until the desired amount of material has been moved.

Additionally, it will be appreciated that a different milling cutter may be used to form a side relieved area at the axial side walls of the pocket so as to provide the aforementioned torque reduction.

It will be appreciated from the above that my invention provides a novel method of forming an anti-friction element retainer cage having circumferentially spaced-apart pockets, each of the pockets having circumferentially projecting tangs extending into the area of the pocket from either the inner or outer diameter or both diameters, which tangs terminate in spaced apart relation a distance less than the diameter of the anti-friction element to be received in the pocket thereby aiding in the retention of the element in the pocket. The retainer is produced from substantially rectangular cross-section ring stock solely by metal removal processes. After formation of the tangs, in some embodiments, portions of the inner or outer diameter may be removed except in the areas of the tangs whereby the tangs become the circumferential ends of the non-interrupted sections of a circumferential inner or outer diameter radial interrupted projection. In additional embodiments, the inner or outer diameter material is not removed whereby the tangs become projections of the main body of the ring.

In a preferred embodiment, the tangs and pockets are provided by first drilling the pockets with a tapered ended drill which does not project its entire diameter through the body of the ring thereby leaving a conical bottom wall, thereafter a notched broach is moved through the drilled pocket, the notches leaving the conical or tapered portions at the bottom of the hole as tangs. In a second method, a pilot hole is first used, the drill forming the pilot hole having a diameter less than the spaced between opposed tangs, a notched broach is then moved through, the notches leaving opposed ledges extending from the inner to the outer diameter of the ring, thereafter a drill head or milling cutter having a diameter greater than the sides of the square pocket formed by the notched broach is moved through the broached hole, the movement terminating prior to full penetration thereby leaving a portion of the ledges projecting into the area of the pocket as tangs. Thereafter, portions of the inner or outer diameter material of the ring can be removed so that the side relieved areas 65 formed by the drill project entirely through the ring. Additionally, a milling cutter or further machining device may be used to project the relieved areas on the side walls normal to the tangs entirely through the material of the ring.

In a third embodiment of the method, the pockets are formed in the rectangular cross-section ring material by a broach which has a plurality of notches so as to leave a plurality of ribs or tongues on circumferentially opposed faces of the pockets. Thereafter, a smaller diameter milling cutter is used to remove a portion of the ribs or ledges so as to provide a number of tangs, greater than two, for each pocket, each tang being formed by a separate cutting action of the milling cutter. Again thereafter portions of the inner diameter or outer diameter whichever the case may be, may be removed so that the tangs provide the axial ends of the non-interrupted segments of an interrupted circumferential projecting ledge. In this embodiment, further machining may be utilized if desired to provide axially opposed relieved areas on the walls of the pockets normal to the projection of the tangs. In a final embodiment, I have shown a method which describes both inner and outer diameter tangs in the same pocket; this method is substantially the same as the prior method except that an axially narrow milling head is used to remove the material from the intermediate sections of the ledges formed by the notched broach. In this way material is left at both the inner and outer diameters for the formation of the tangs from the material of the ring left intact by the notches of the broach. In this case, as in all prior cases, the distance spacing opposed notches in a circumferential direction is less than the diameter of the anti-friction element received in the pocket. In this particular case, the elements may be inserted into the pocket either by heating the retainer to expand the material of the ring or by using deformable or contracted rolling elements at the initial point of assembly.

It will be further appreciated that common to all of the above embodiments is the formation of the completed retainer solely by metal removal by a substantially rectangular cross-section ring. The ring is initially formed without any projection ledges or circumferential tongues or the like. Although the above retainer has been described as manufactured of metal, it is to be understood that the retainer may be of other materials as desired.

Although the teachings of my invention have herein been discussed with reference to specific theories and illustrated embodiments, it is to be understood that these are by way of illustration only and that others may wish to utilize my invention in different designs or applications.

I claim as my invention:

1. The method of manufacturing an anti-friction roller element retainer cage which comprises the steps of:
   a. Forming a ring of substantially rectangular cross-section,
   b. Forming a plurality of circumferentially spaced-apart pockets in said ring by material removal from the said ring,
   c. Forming opposed tangs in said pocket, said tangs formed solely by selected removal of material adjacent to said tangs whereby the said tangs are formed integrally with the said ring, the said tangs being circumferentially spaced apart by a distance less than the diameter of the rolling elements to be received in the pockets, and
   d. Forming the said tangs adjacent at least one of the diameters of the said ring, the said tangs projecting into the area of the said pockets.

2. The method of manufacturing a roller element retaining ring for anti-friction bearing assemblies which comprises the steps of: forming a ring of substantially rectangular cross section, boring a plurality of circumferentially spaced-apart circular pockets radially through said ring, the full diameter of said pockets terminating within the said ring in a curved bottom wall, broaching the said pockets through the radial thickness of said ring with a notched rectangular cross-section broach providing the pockets with circumferentially spaced-apart tangs at the circumferential sides of the said pocket adjacent one diameter face of the said rings, the said tangs comprising only portions of the said curved bottom wall of said pocket formed by the said boring operation, left unremoved by the notches the bored pockets in the said ring having a major diameter greater than the side walls of the said notched broach whereby the said broached pockets have radially extending relieved areas on axial and circumferential side walls of the said pocket, the said curved bottom wall of the axial sides of the said pocket substantially removed by the broaching operation, and forming an interrupted tongue by metal removal from one diameter face of the ring to provide a centrally disposed interrupted circumferential tongue, the interruptions comprising the spaced apart distance between opposed tangs.

3. The method of manufacturing an anti-friction element retainer cage for anti-friction bearing assemblies which comprises the steps of: Forming a ring blank of substantially rectangular cross section, boring a plurality of pilot holes through the said ring blank from the inner diameter to the outer diameter thereof, the diameter of the said pilot hole being less than the circumferential distance between opposed tangs to be formed, broaching the said pilot hole with a notched broach having a wide wall dimension greater than the diameter of the said pilot hole, the said notches providing circumferentially opposed ledges extending from the inner diameter to the outer diameter of the said notched hole, the said ledges circumferentially spaced apart a distance greater than the diameter of the pilot hole whereby the said broached hole is substantially rectangular with circumferentially spaced apart opposed projecting ledges, removing metal from the said notched holes with a circular tool having a diameter greater than the sides of the said rectangular broached hole, the said metal removed from the ring to a depth less than the depth of the broached hole whereby portions of the ledges remain adjacent one diameter face of the ring, the metal removal forming relieved areas circumferentially behind and radially beyond the remaining areas of the ledges and forming relieved areas on the axial side walls of the pockets, the remaining areas of the opposed ledges forming tangs adjacent one diameter face of the ring.

4. The method of claim 3 including the further step of material removal from the one diameter face to either axial side of the tangs to provide a centrally disposed interrupted circumferential ledge, the interruptions comprising the spaced apart distance between opposed tangs in each pocket, the material removal from one diameter face opening the said diameter face to the bottoms of the relieved areas.

5. The method of manufacturing a retainer cage for anti-friction element bearing which comprises the steps of: forming a substantially rectangular cross-section ring having an inner and outer diameter, providing a plurality of circumferentially spaced-apart pockets through said ring, the pockets extending from the inner to the outer diameter, the pockets formed by material removal from the said ring, the said pockets formed with a notched broach, the said notched broach leaving a plurality of axially spaced apart circumferentially inwardly projecting edges on each of the circumferential end walls of said pocket, the said ledges extending from the inner to the outer diameter of the said ring, the said ledges on opposed walls in opposed spaced apart relation, the said opposed ledges spaced apart by a distance less than the diameter of the anti-friction element to be received in the pocket, the said ledges integral with the said ring, removing material from the said ring in the area of the said pockets at the said ledges from one diameter face thereof by a milling cutter, the said milling cutter removing the said material to a radial depth less than the thickness of the said ring whereby portions of the said ledges remain adjacent one diameter face of the said ring, the said remaining portions forming tangs for retaining an anti-friction element in the said pocket, each of the said tangs formed by a separate operation of the milling cutter.

6. The method of claim 5 wherein radial portions of one diameter face of the said ring are removed adjacent and intermediate of the said tangs whereby the said tangs project beyond the said one diameter face and provide the circumferential ends of an interrupted circumferential radial projection on the one diameter face of the ring, the interruptions being the spaces between the opposed tangs for each pocket.

7. The method of claim 5 wherein additional material is removed from the axial side walls of the pocket to provide relieved areas at the axial side walls.

8. The method of claim 5 wherein four tangs are provided for each pocket, two tangs on each circumferential side wall of the pocket.

9. The method of manufacturing a retainer cage for anti-friction bearing elements which comprises the steps of: forming a substantially rectangular cross-section ring having an inner and outer diameter and axial end walls, removing ring material from a plurality of circumferentially spaced points around said ring to form pockets through said ring, leaving ledges projecting into each of said pockets, at least one ledge projecting into the said pocket from the circumferentially fore and aft walls of the said pocket in a circumferential direction, the said ledges terminating in the said pocket in spaced-apart relation, spaced from one another in opposed relation a distance less than the major diameter of the elements to be received in the retainer, the ledges extending from the inner diameter and to the outer diameter of the said ring, and removing an intermediate portion of the said ledges leaving circumferentially projecting tangs adjacent to the outer diameter and to the inner diameter of the said ring, the tangs projecting into the pockets, the tangs formed by the material of the ledges left unremoved.

10. The method of claim 9 wherein two ledges are provided in each of the circumferentially fore and aft sides of each pocket whereby eight tangs are formed for each pocket four adjacent to the inner diameter and four adjacent to the outer diameter.

* * * * *